US011773299B2

(12) United States Patent
Park (10) Patent No.: US 11,773,299 B2
(45) Date of Patent: Oct. 3, 2023

(54) STICKY ADHESIVE MESH AND METHOD FOR MANUFACTURING STICKY ADHESIVE MESH

(71) Applicants: Sung-Ho Park, Seoul (KR); HI-CO., LTD., Gimhae-si (KR); GUNWOO DPSOL CO., LTD., Daegu (KR)

(72) Inventor: Sung-Ho Park, Seoul (KR)

(73) Assignees: Sung-ho Park; HI-CO., LTD.; GUNWOO DPSOL CO., LTD.

( * ) Notice: Subject to any disclaimer, the term of this patent is extended or adjusted under 35 U.S.C. 154(b) by 0 days.

(21) Appl. No.: 17/434,396

(22) PCT Filed: Dec. 11, 2019

(86) PCT No.: PCT/KR2019/017515
§ 371 (c)(1),
(2) Date: Aug. 26, 2021

(87) PCT Pub. No.: WO2020/175776
PCT Pub. Date: Sep. 3, 2020

(65) Prior Publication Data
US 2022/0145137 A1 May 12, 2022

(30) Foreign Application Priority Data
Feb. 27, 2019 (KR) .................. 10-2019-0022983

(51) Int. Cl.
*C09J 7/29* (2018.01)
*C09J 7/40* (2018.01)
(Continued)

(52) U.S. Cl.
CPC . *C09J 7/29* (2018.01); *C09J 7/21* (2018.01); *C09J 7/38* (2018.01); *C09J 7/405* (2018.01);
(Continued)

(58) Field of Classification Search
CPC ......... C09J 7/29; C09J 7/21; C09J 7/38; C09J 7/405; C09J 2301/122; C09J 2301/208; C09J 2400/263; Y10T 428/14
See application file for complete search history.

(56) References Cited

U.S. PATENT DOCUMENTS

| 8,679,612 B2 | 3/2014 | Poulus |
| 2015/0337174 A1 | 11/2015 | Keite-Telgenbuscher et al. |

FOREIGN PATENT DOCUMENTS

| JP | 2003-066850 A | 3/2003 |
| KR | 1020050097399 A | 10/2005 |

(Continued)

OTHER PUBLICATIONS

Extended European Search Report for EP19917062.2 by European Patent Office dated Apr. 26, 2022.
(Continued)

*Primary Examiner* — Patricia L. Nordmeyer
(74) *Attorney, Agent, or Firm* — BROADVIEW IP LAW, PC (57) ABSTRACT

The present invention relates to an adhesive sheet made of a fiber material, and a method for manufacturing same, the sticky adhesive mesh comprising mesh fabric, an ink layer printed on the upper surface of the mesh fabric, a first adhesive layer coated on the lower surface of the mesh fabric, an absorption layer stacked on the lower surface of the first adhesive layer, a second adhesive layer coated on the lower surface of the absorption layer, and release paper stacked on the lower surface of the second adhesive layer, wherein the mesh fabric is made of fabric woven by crossing wefts and warps and is formed to be porous by having gaps between the wefts and the warps, the first adhesive layer is formed to have a plurality of adhesive layers that are repeatedly coated to be stacked.

7 Claims, 8 Drawing Sheets

(51) Int. Cl.
*C09J 7/21* (2018.01)
*C09J 7/38* (2018.01)

(52) U.S. Cl.
CPC .... *C09J 2301/122* (2020.08); *C09J 2301/208* (2020.08); *C09J 2400/263* (2013.01); *Y10T 428/14* (2015.01)

(56) References Cited

FOREIGN PATENT DOCUMENTS

| KR | 1020090027046 A | 3/2009 |
| KR | 100933358 B1 | 12/2009 |
| KR | 1020170074123 A | 6/2017 |

OTHER PUBLICATIONS

Examination Report No. 1 for standard patent application for AU2019431639 by IP Australia dated Aug. 24, 2022.

STICKY ADHESIVE MESH AND METHOD FOR MANUFACTURING STICKY ADHESIVE MESH

CROSS-REFERENCE TO RELATED APPLICATIONS

This application is the U.S. National Stage filing under 35 U.S.C. 371 of International Application No. PCT/KR2019/017515, filed on Dec. 11, 2019, which claims priority to Korean Patent Application No. 10-2019-0022983, filed on Feb. 27, 2019, the contents of which are hereby incorporated by reference in their entirety.

TECHNICAL FIELD

The present disclosure relates to an adhesive sheet attached to a glass window and a method of fabricating the same, and more particularly, to an adhesive sheet formed of fibers and a method of fabricating the same.

BACKGROUND ART

An interior member attached to an indoor window is usually finished with a decorative film. However, since the decorative film is made of resin, it does not give a full feeling of natural fibers, thus having limitations in creating a sophisticated atmosphere. The decorative film shrinks over time, and the resulting crumple and wrinkles lead to a poor appearance. Moreover, because the decorative film contains harmful substances such as polyvinyl chloride (PVC), phthalate, formaldehyde, total volatile organic compounds (TVOC), toluene, or the like, which is mainly used as a raw material, the decorative film is harmful to the human body.

Along with the recent popularity of high-quality natural materials such as traditional Korean paper, changhoji and much interest in well-being culture as well as to solve the above problem, various natural materials are used for changhoji.

However, mesh fibers have not recently been used for changhoji. This is attributed to the following reason: to produce an adhesive sheet particularly with mesh fibers, an adhesive is applied to the back of a mesh fabric, the ink absorption rate of the fabric decreases during printing, and the ink component permeates through the empty space of the mesh fabric and reacts with the adhesive, thereby transforming the components of the adhesive, degrading the performance of the adhesive, and thus causing easy peeling.

In addition, when the adhesive is applied to the back of the mesh fabric, the adhesive fills in pores between the fibers and thus the appearance becomes poor. Particularly in the case of solvent ink output, ink I is absorbed excessively between the fibers, thus decreasing print quality. In many cases, the ink I is not well absorbed into the mesh fibers, and thus the print quality is decreased.

Therefore, there is a need for a technique for an adhesive sheet in which adhesive performance is not degraded even though mesh fibers made of natural materials are used as a main material, and an adhesive strength is not decreased by ink printing.

DISCLOSURE

Technical Problem

Accordingly, an object of the present disclosure is to provide a sticker-type adhesive mesh in a structure satisfying two contradictory requirements of high adhesion maintenance and excellent print quality, while it is made of mesh fibers.

Technical Solution

To achieve the above object, a sticker-type adhesive mesh includes a mesh fabric 20, an ink layer 10 printed on a top surface of the mesh fabric 20, a first adhesive layer 30 coated on a bottom surface of the mesh fabric 20, an absorption layer 40 deposited on a bottom surface of the first adhesive layer 30, a second adhesive layer 50 coated on a bottom surface of the absorption layer 40, and a release paper 60 deposited on a bottom surface of the second adhesive layer 50.

The mesh fabric is a fabric which is woven by crossing wefts and warps and is porous due to gaps between the wefts and the warps. Particularly, the first adhesive layer 30 is a stack of a plurality of repeatedly coated adhesive layers, each being formed to be a thin film.

Further, the first adhesive layer 30 may be formed to be porous in correspondence with the shape of the bottom surface of the mesh fabric 20 by repeatedly coating the plurality of adhesive layers of the first adhesive layer 30 at a contact portion of the mesh fabric 20.

The absorption layer 40 may be formed to be porous in the same shape as the first adhesive layer. A fused layer 42 may be formed between the absorption layer and the first adhesive layer 30 by thermally melting a rear surface of the first adhesive layer to a predetermined depth to be bonded to a part of a top surface of the absorption.

Further, as the release paper 60 is formed of a porous or absorbing material, a part of ink I in the ink layer 10 may pass through the mesh fabric 20, the first adhesive layer 30, the absorption layer 40, and the second adhesive layer 50 and may absorbed to a partial depth from a top surface of the release paper 60 during the printing of the ink layer 10, to form an absorption layer 62 on the top surface of the release paper 60.

A method of fabricating a sticker-type adhesive mesh, according to the present disclosure includes forming a first adhesive layer 30 by preparing a mesh fabric 20 which is woven by crossing wefts and warps to be porous on the whole, and coating an adhesive to a bottom surface of the mesh fabric 20, depositing an absorption layer 40 on a bottom surface of the first adhesive layer 30, coating a second adhesive layer 50 on a bottom surface of the absorption layer 40, depositing a release paper 60 on a bottom surface of the second adhesive layer 50, and forming an ink layer 10 by printing ink I on a top surface of the mesh fabric 20.

The formation of a first adhesive layer 30 may include forming the first adhesive layer 30 to be porous by repeatedly coating and then curing an adhesive a plurality of times and coating the first adhesive layer 30 only at a contact portion of the bottom surface of the mesh fabric 20 in correspondence with a porous shape of the bottom surface of the mesh fabric 20.

The first adhesive layer 30 may be coated by micro gravure printing.

The deposition of an absorption layer 40 may include forming the absorption layer 40 to be porous in the same shape as the first adhesive layer 30 by bonding a porous absorption film to the bottom surface of the first adhesive layer 30 in a laminating manner or coating an absorbent melting solution on the bottom surface of the first adhesive layer 30.

Further, the deposition of an absorption layer 40 may include forming the first adhesive layer 30 in a semi-melted state to a predetermined depth upward from the bottom surface of the first adhesive layer 20 by passing the mesh fabric 20 coated with the first adhesive layer 30 at a predetermined speed through a heater shortly before the bonding or coating. Thus, a part of the semi-melted first adhesive layer 30 may be fused to a top surface of the absorption layer 40 during the bonding or coating of the absorption layer 40 to the bottom surface of the first adhesive layer.

The release paper 60 may be formed of a porous or absorbing material to enable the ink I sequentially passed through the mesh fabric 20, the first adhesive layer 30, the absorption layer 40, and the second adhesive layer 50 to be absorbed on the release paper 60 and thus form an absorption layer 62.

Advantageous Effects

Because a sticker-type adhesive mesh according to the present disclosure is made of a porous material, a mesh fabric 20, which is difficult to apply an adhesive and print with ink I, may have both opposite characteristics of excellent print quality and excellent adhesion. Therefore, compared to a conventional decorative adhesive sheet for windows, the sticker-type adhesive mesh has the effect of creating a feeling of luxurious interior inherent to natural materials.

BEST MODE

With reference to the attached drawings, the present disclosure will be described below in detail.

Figure 1:
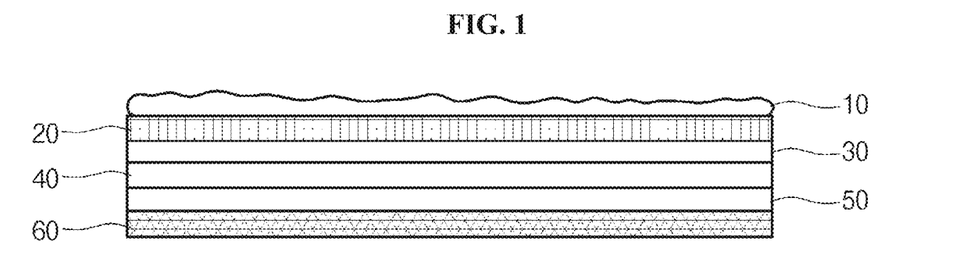
FIG. 1 is a sectional view illustrating a sticker-type adhesive mesh according to the present disclosure.

As illustrated in FIG. 1, a sticker-type adhesive mesh according to the present disclosure includes the mesh fabric 20, the ink layer 10 printed on the top surface of the mesh fabric 20, the first adhesive layer 30 coated on the bottom surface of the mesh fabric 20, the absorption layer 40 deposited on the bottom surface of the first adhesive layer 30, the second adhesive layer 50 coated on the bottom surface of the absorption layer 40, and the release paper 60 deposited on the bottom surface of the second adhesive layer 50.

The mesh fabric 20 is a woven fabric in which wefts and warps are crossed. Most of general textile fabrics are available as the mesh fabric 20. All kinds of fabrics made of natural materials as well as resin such as nylon are available.

Since wefts and warps are woven into the mesh fabric 20, the mesh fabric 20 is porous due to gaps between the wefts and the warps. This is not because the mesh fabric 20 applied to the present disclosure is a special fabric, but because a fabric is generally formed by twisting fine microfibers into yarns and then weaving the yarns, with natural fine gaps, and thus has a porous structure.

Particularly, the importance lies in that the first adhesive layer 30 is a stack of a plurality of repeatedly coated adhesive layers.

One of the main reasons that the mesh fabric 20 was difficult to be adopted as the base of an adhesive sheet in the prior art is that because the mesh fabric 20 is made of a porous material, an adhesive applied to the bottom surface of the mesh fabric 20 permeates into the gaps of the mesh fabric 20 and then to the top surface of the mesh fabric 20, making printing difficult. Another reason is that since the mesh fabric 20 is made of a porous material, the adhesive is applied over a small area, unlike resin or metal which is uniform and has high surface energy.

In addition, even though a large amount of adhesive is applied to the bottom surface of the mesh fabric 20 in terms of a fiber structure, just one application process leaves a very small amount of adhesive that actually exerts an adhesive force on the bottom surface of the mesh fabric 20, with the remaining adhesive absorbed or permeating between fabric tissues and then protruding to the top surface of the mesh fabric 20. Therefore, the appearance of the mesh fabric 20 becomes poor and ink printing is adversely affected.

That is, this is the same reasoning that it is more difficult to attach a net to a wall by an adhesive than to attach vinyl to a wall by an adhesive. Even though the mesh fabric 20 is incomparably more densely woven than a net, the mesh fabric 20 has a porous-like surface due to the presence of fine gaps between the wefts and the warps, instead of an airtight surface.

Therefore, when the adhesive is applied to the mesh fabric 20 just once like a general decorative sheet, the adhesive is absorbed into the gaps of the mesh fabric 20 and protrudes on the top surface of the mesh fabric 20. Eventually, the appearance of the mesh fabric 20 becomes poor and a significant amount of adhesive permeates into the gaps of the mesh fabric 20, so that only a small amount of a component exerting an adhesive force remains on the bottom of the mesh fabric 20.

Conventionally, when the adhesive is applied to the mesh fabric only once, ink causes shape deformation in the adhesive, and thus wrinkles and curls are generated. Therefore, the mesh fabric may not be subject particularly to inkjet printing.

In the case where a mesh fabric adhesive sheet is to be produced by inkjet printing, when a large amount of adhesive is applied only once, the mesh fabric adhesive sheet is deformed such as wrinkles, curls, and warps. The resulting friction between a printer head and the mesh fabric damages a printer.

To prevent the adhesive introduced between the microstructures of the mesh fabric 20 from adversely affecting the printing process of the mesh fabric 20 and remaining only in a small amount on the back of the mesh fabric 20, two technical elements are introduced in the present disclosure.

Figure 6:
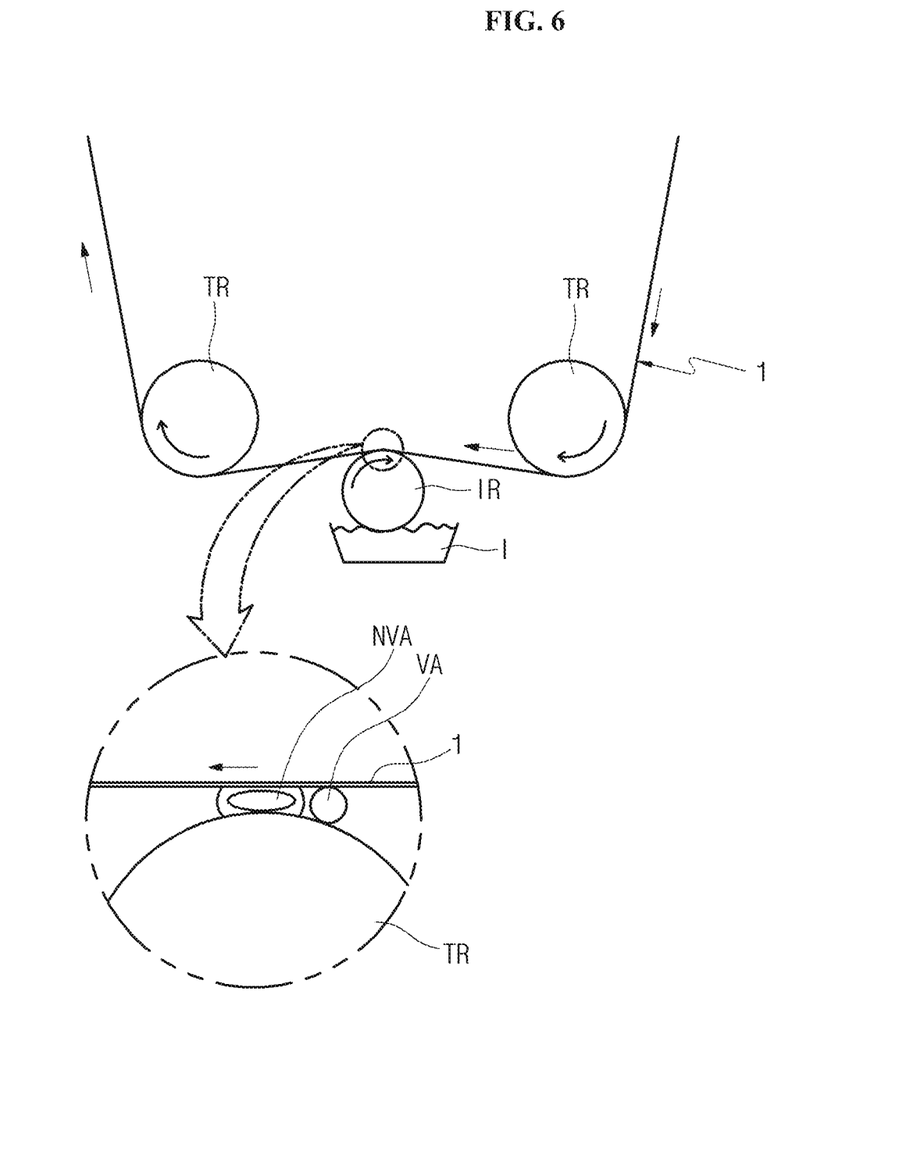
FIG. 6 is a conceptual view illustrating the coating principle of the first or second adhesive layer 50.
Figure 7:
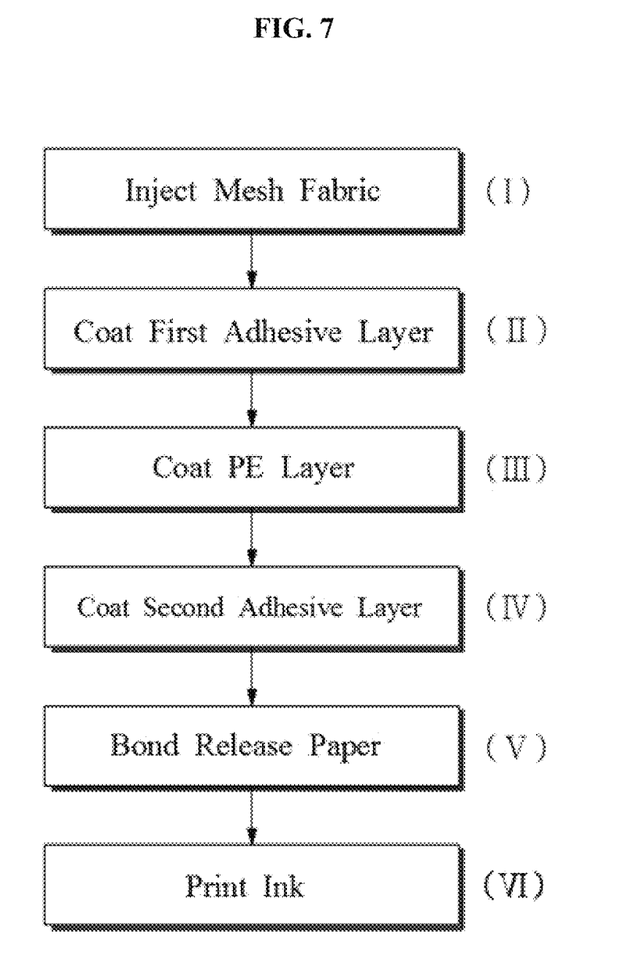
FIG. 7 is a block diagram illustrating a method of fabricating a sticker-type adhesive mesh according to the present disclosure.
Figure 8:
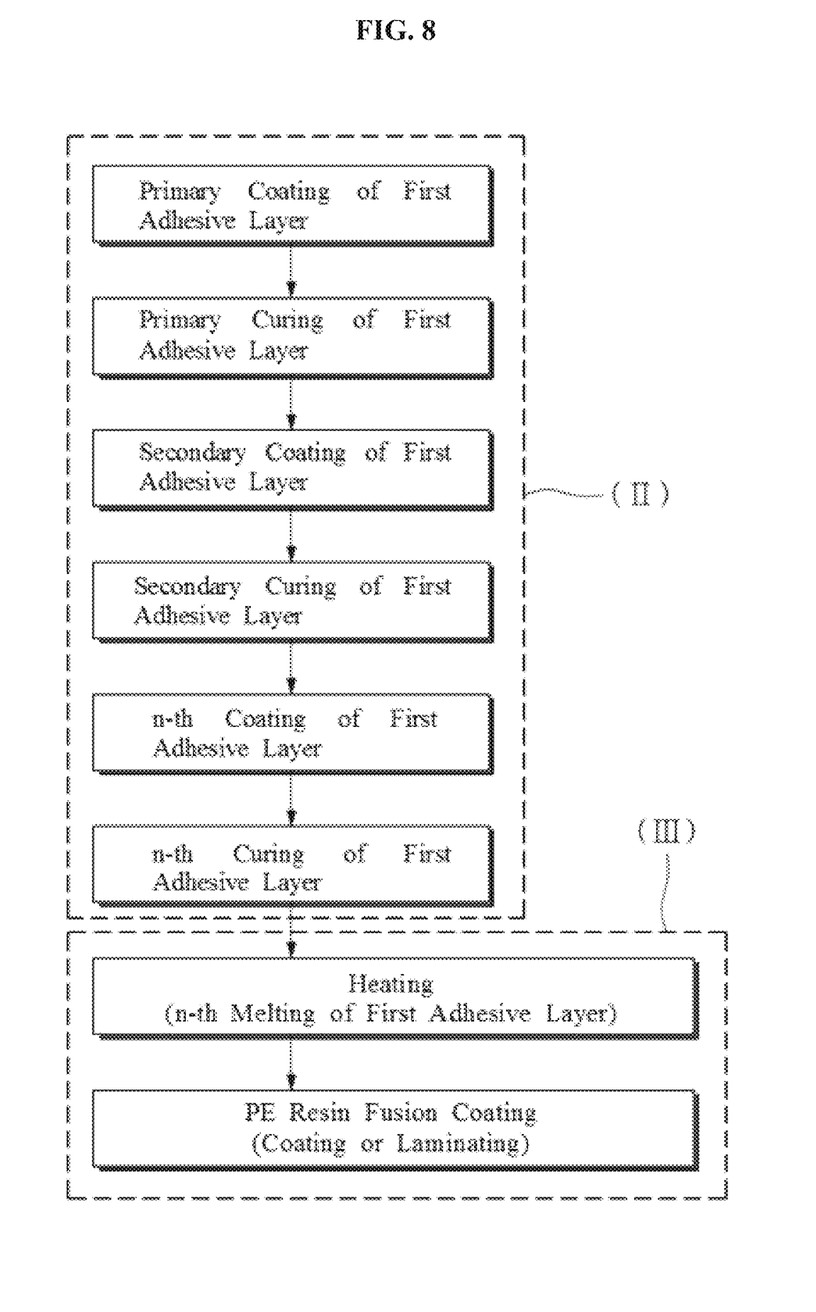
FIG. 8 is a detailed block diagram illustrating step II and step III illustrated in FIG.

First, an adhesive is applied in the form of a thin film on the back of the mesh fabric 20 in a micro-gravure method as illustrated in FIG. 6, rather than the adhesive is coated with strong pressure as is done conventionally. When the adhesive layer is coated in the form of a thin film as described above, the phenomenon that the adhesive is absorbed into the gaps of the mesh fabric 20 and penetrates to the top surface of the mesh fabric 20 is prevented, so that even in a printing process to be described later, the texture of the mesh fabric 20 still exists.

Secondly, the first adhesive layer 30 is formed by forming a plurality of adhesive layers in the form of thin films as described above. One thin film layer is extremely thin, thereby preventing the adhesive from penetrating into the gaps of the mesh fabric 20. However, the single thin film layer has limitations in exerting an intended adhesive force due to its small thickness. Therefore, when the first adhesive layer 30 is formed as a stack of a plurality of adhesive layers in the form of thin films, the dual effects of exertion of as much an adhesive force as required and prevention of the adhesive from penetrating to the top surface of the mesh fabric 20 may be achieved.

Micro gravure printing illustrated in FIG. 6 is referred to as reverse roll kiss coating in technical terms. Micro gravure is derived from a simple method of uniformly applying paint and ink for thin film coating by minimizing the vortex area VA of paint and ink to minimize a wrap angle between a substrate and a coating roll IR during kiss coating. Due to the absence of a nip roll, the micro gravure coating method offers the benefits of stable thin film coating on an ultra-thin substrate and no agglomeration of the paint and the ink I. Further, a smoothing effect may be expected from reverse rotation of the coating roll IR, and due to the nature of the process, it is easy to apply micro gravure printing to roll-to-roll equipment. Therefore, easy and uniform thin film coating is possible by low-price mass production. Further, since the micro gravure coating technology brings the adhesive mesh I into fine contact with the micro gravure coating roll IR by means of two tension rolls TR supporting the adhesive mesh I to coat a thin film, it may form a finest thin film among the current contact-type thin film coating technologies, enabling solution coating of up to 800 nm. In addition, a reference speed of 30 m/min leads to high-speed mass production of patterned thin films.

As described above, although the micro gravure printing method is conventionally used only for printing, the adhesive is coated in a plurality thin-film layers on the back of the mesh fabric 20 based on the property that it is possible to form an ultra-thin film in micro gravure, without affecting the surface effect and printing of the mesh fabric, while the porous structure of the mesh fabric 20 is maintained and an intended adhesion force may be applied to the back of the mesh fabric 20 in the present disclosure. This effect allows stable printing of the ink I without decreasing the adhesive force by the ink I during ink printing, which will be described later.

Figure 2:
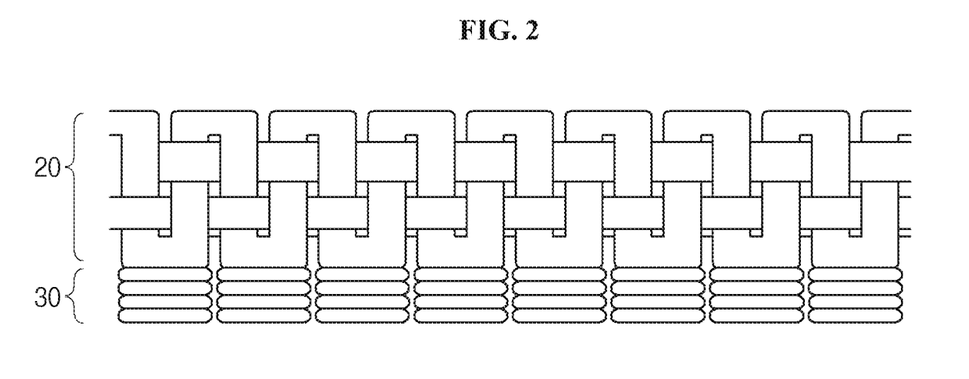
FIG. 2 is a sectional view enlarging only a mesh fabric 20 and a first adhesive layer 30 illustrated in FIG. 1.

As described above, the plurality of adhesive layers in the first adhesive layer 30 are repeatedly coated on a contact portion of the mesh fabric 20 as illustrated in FIG. 2, so that the first adhesive layer 30 is formed to be porous in correspondence with the shape of the bottom surface of the mesh fabric 20.

The absorption layer 40, the second adhesive 50, and the release paper 60 are sequentially bonded to each other, separately from the previous process of coating the first adhesive layer 30. Then, with the absorption layer 40, the second adhesive 50, and the release paper 60 integrally bonded, the absorbent layer 40, the second adhesive 50, and the release paper 60 are bonded to the bottom surface of the first adhesive layer 30. As the first adhesive layer 30 is previously formed in the same porous structure as that of the mesh fabric 20, the ink I may be absorbed into the mesh fabric 20 without spreading on the surface of the mesh fabric 20 during the subsequent ink printing. Accordingly, the absorption layer 40 is also preferably formed in a porous structure. Alternatively, the absorption layer 40 is made of a resin material having a structure capable of absorbing liquid.

Accordingly, the absorption layer 40 may first be deposited on the first adhesive layer 30 in the form of a laminated absorption film having a porous microstructure and bonded to the first adhesive layer 30.

For reference, there is no temporal relationship between the process of sequentially bonding the absorption layer 40, the second adhesive 50, and the release paper 60, and the process of coating the first adhesive layer 30 on the mesh fabric 20 described above. That is, the absorption layer 40 and the release paper 60 may be bonded to each other in a separate process, and separately prepared as an intermediate process product.

In this case, as the absorption layer 40 is also formed in the porous structure from the mesh fabric 20 to the first adhesive layer 30, the adhesive effect may be increased while the advantages of the porous structure are still taken.

Therefore, as the ink that has passed through the mesh fabric 20 and the first adhesive layer 30 is absorbed in the absorption layer 40 in the later-described ink printing process, the problem that the ink spreads on the top surface of the mesh fabric 20 or the adhesive force of the first adhesive layer 30 is decreased does not occur. Therefore, the natural-material texture of the mesh fabric 20 may be kept.

Figure 3:
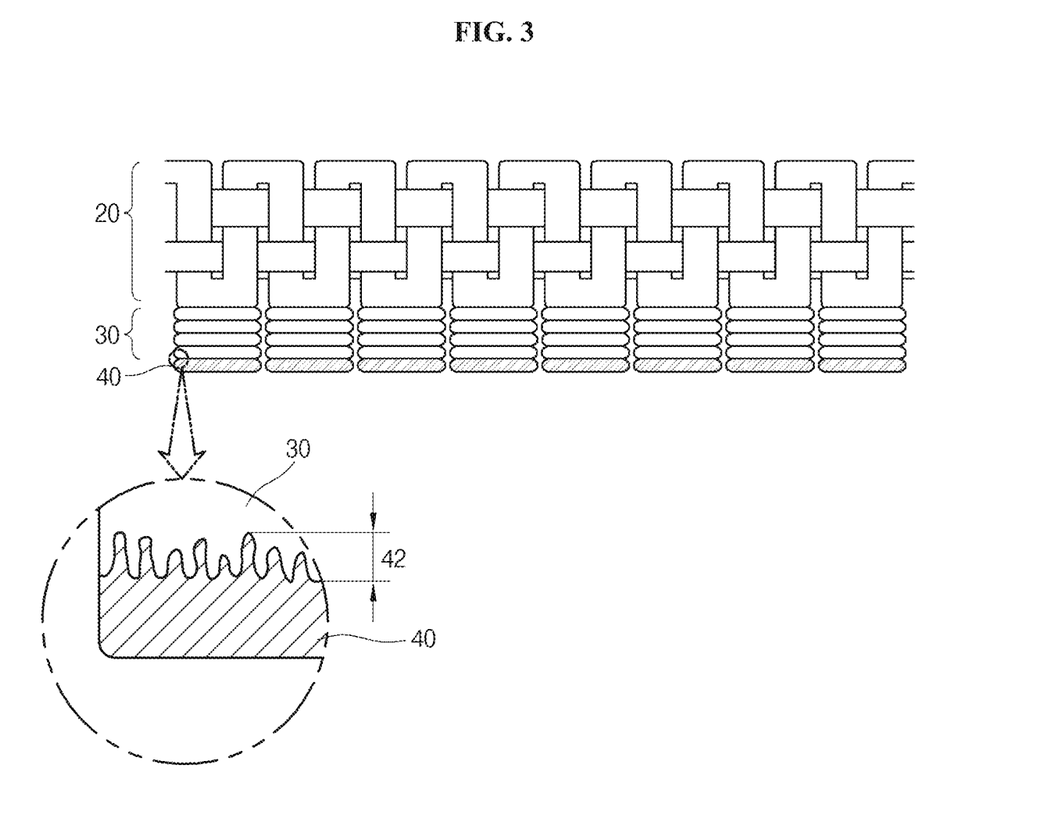
FIG. 3 is a sectional view illustrating an absorption layer 40 in addition to the structure illustrated in FIG. 2.
Figure 4:
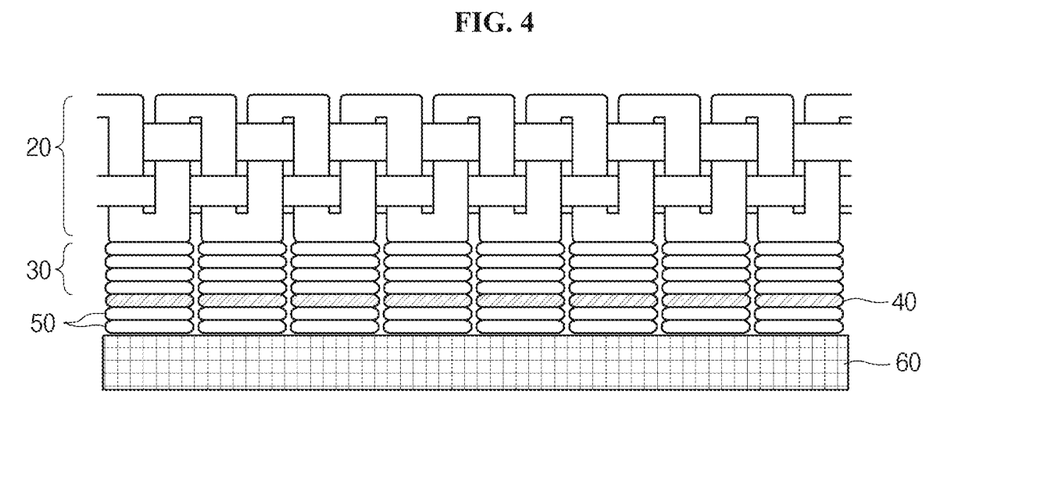
FIG. 4 is a sectional view illustrating a second adhesive layer 50 and a release paper 60 in addition to the structure illustrated in FIG. 3.
Figure 5:
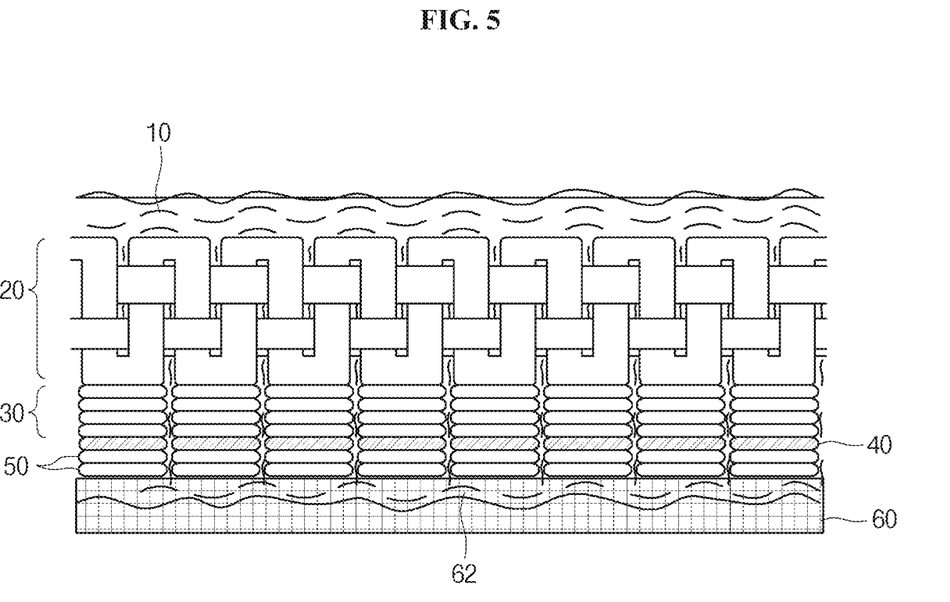
FIG. 5 is a sectional view illustrating an ink layer 10 in addition to the structure illustrated in FIG. 4.

The absorption layer 40 is coated on the first adhesive layer 30 as illustrated in FIG. 3. For reference, for strong bondage between the absorption layer 40 and the adhesive layer 30, the mesh fabric 20 coated with the first adhesive layer 30 passes through a heater so that the plurality of adhesive layers of the first adhesive layer 30 are at 90° C. to 110° C. to a depth from the bottom to the top. Therefore, the first adhesive layer 30 is activated with heat to be easily fused to the absorption layer 40.

However, the second adhesive layer 50 and the release paper 60 are not shown in FIG. 3, for convenience.

Figure 9:
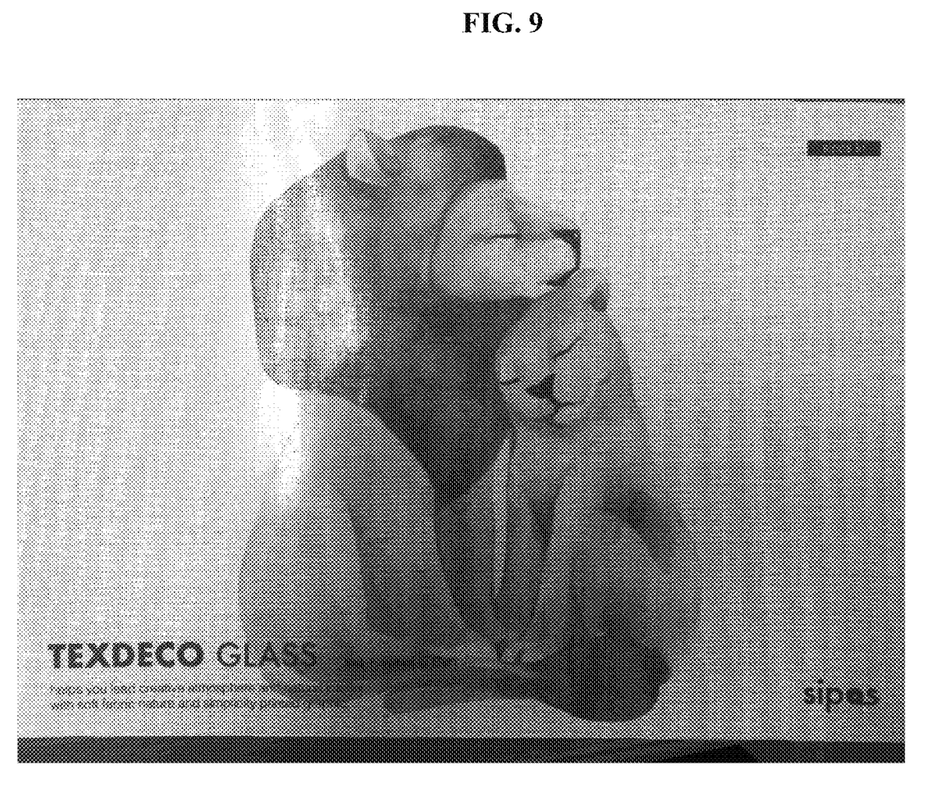
FIG. 9 is a picture of the front of the sticker-type adhesive mesh according to the present disclosure.
Figure 10:
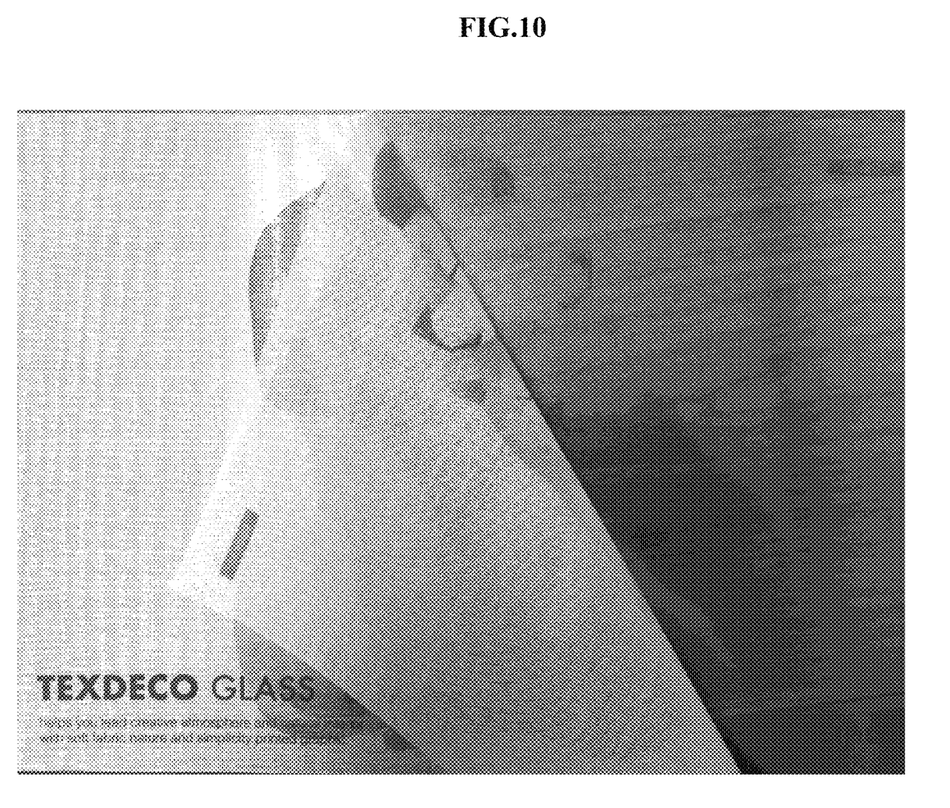
FIG. 10 is a picture of the release paper 60 which is being removed from the sticker-type adhesive mesh illustrated in FIG. 9.

The material of the release paper 60 is not limited to a specific one. For reference, the release paper 60 is illustrated in the pictures of FIGS. 9 and 10. FIG. 9 is a picture of the front of the adhesive mesh according to the present disclosure, and FIG. 10 is a picture showing that as the absorption layer 40, the second adhesive 50, and the release paper 60 are removed from the mesh fabric 20, the absorption layer 40 appears to be faintly printed due to the ink layer 10 absorbed to the absorption layer 40 bonded to the release paper 60. For reference, when the absorption layer 40, the second adhesive 50, and the release paper 60 are removed from the mesh fabric 20 as such, the mesh fabric 20 with the ink printed on the top surface and the first adhesive layer 30 coated on the bottom surface remains. Finally, the mesh fabric 20 with the ink printed on the top surface and the first adhesive layer 30 coated on the bottom surface is attached.

INDUSTRIAL APPLICABILITY

While the above-described sticker-type adhesive mesh and the method of fabricating the same may be used for window wallpaper, they are also applicable for various purposes in general interior decoration or furniture finishing. Further, the present disclosure is applicable to adhesive sticker products produced by inkjet printing.

The above-described present disclosure is not limited by the foregoing embodiments and the accompanying drawings, and it is apparent to those skilled in the art that many replacement, modifications, and variations can be made without departing from the technical scope of the present disclosure.

The invention claimed is:

1. A sticker adhesive mesh comprising:
a mesh fabric;
an ink layer printed on a top surface of the mesh fabric;
a first adhesive layer coated on a bottom surface of the mesh fabric;
an absorption layer deposited on a bottom surface of the first adhesive layer;
a second adhesive layer coated on a bottom surface of the absorption layer; and
a release paper deposited on a bottom surface of the second adhesive layer,
wherein the mesh fabric is a fabric which is woven by crossing wefts and warps and is porous due to gaps between the wefts and the warps,
wherein the first adhesive layer is a stack of a plurality of repeatedly coated adhesive layers, each being formed to be a thin film, and
wherein the first adhesive layer is formed to be porous in correspondence with the shape of the bottom surface of the mesh fabric by repeatedly coating the plurality of adhesive layers of the first adhesive layer at a contact portion of the mesh fabric.

2. The sticker adhesive mesh according to claim 1, wherein the absorption layer is formed of an absorbing or porous resin material to enable a liquid material such as ink to permeate into fine tissues of the absorption layer, and
wherein the absorption layer, the second adhesive layer, and the release paper are integrally formed and fused to the bottom surface of the first adhesive layer.

3. The sticker adhesive mesh according to claim 2, wherein a part of ink in the ink layer is absorbed into the mesh fabric and the first adhesive layer, and absorbed to a partial depth from a top surface of the absorption layer.

4. A method of fabricating a sticker adhesive mesh, comprising:
forming a first adhesive layer by preparing a mesh fabric which is woven by crossing wefts and warps to be porous on the whole, and coating an adhesive to a bottom surface of the mesh fabric;
preparing a sheet-type absorption layer formed of an absorbing or porous resin material, separately from the mesh fabric and the first adhesive layer, and coating a second adhesive layer on a bottom surface of the absorption layer;
depositing a release paper on a bottom surface of the second adhesive layer;
bonding the absorption layer and the release paper integrally bonded to each other by the second adhesive layer to the bottom surface of the first adhesive layer; and
forming an ink layer by printing ink on a top surface of the mesh fabric,
wherein the formation of the first adhesive layer is placed in no temporal relationship with the coating of a second adhesive layer and the deposition of a release paper,
wherein the formation of the first adhesive layer comprises forming the first adhesive layer to be porous in correspondence with the shape of the mesh fabric by coating the first adhesive layer only on a contact portion of the bottom surface of the mesh fabric in correspondence with a porous shape of the bottom surface of the mesh fabric, and wherein the formation of the first adhesive layer comprises forming a stack of a plurality of repeatedly coated adhesive layers, each being formed to be a thin film.

5. The method of claim 4, wherein the first adhesive layer is coated by micro gravure printing.

6. The method of claim 4, wherein the bonding of the absorption layer and the release paper integrally bonded to each other by the second adhesive layer to the bottom surface of the first adhesive layer comprises
forming the first adhesive layer in a thermally active state to a predetermined depth upward from the bottom surface of the first adhesive layer by passing the mesh fabric coated with the first adhesive layer at a predetermined speed through a heater shortly before the bonding, to fuse a part of the first adhesive layer with a top surface of the absorption layer.

7. The method of claim 6, wherein the release paper is formed of a porous or absorbing material to enable the ink sequentially passed through the mesh fabric and the first adhesive layer to be absorbed into the absorption layer during the formation of the ink layer.

* * * * *